(12) United States Patent
Ide et al.

(10) Patent No.: US 7,764,851 B2
(45) Date of Patent: Jul. 27, 2010

(54) OPTICAL MODULATORS

(75) Inventors: Akiyoshi Ide, Kasugai (JP); Jungo Kondo, Aichi-Pref. (JP); Osamu Mitomi, Nagoya (JP); Yasunori Iwasaki, Kitanagoya (JP); Hiroki Kobayashi, Kitanagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/260,276

(22) Filed: Oct. 29, 2008

(65) Prior Publication Data
US 2009/0142015 A1    Jun. 4, 2009

(30) Foreign Application Priority Data

Nov. 1, 2007  (JP) .............................. 2007-285036
Oct. 28, 2008  (JP) .............................. 2008-276657

(51) Int. Cl.
*G02F 1/295* (2006.01)

(52) U.S. Cl. .............................................. 385/8; 385/4
(58) Field of Classification Search ...................... 385/2, 385/4, 8, 10
See application file for complete search history.

(56) References Cited

U.S. PATENT DOCUMENTS

| | | | |
|---|---|---|---|
| 5,408,566 A | 4/1995 | Eda et al. | |
| 5,953,466 A | 9/1999 | Kubota et al. | |
| 5,978,524 A * | 11/1999 | Bischel et al. | 385/4 |
| 2001/0009594 A1* | 7/2001 | Hosoi | 385/2 |
| 2003/0138180 A1 | 7/2003 | Kondo et al. | |
| 2005/0265663 A1 | 12/2005 | Maruyama et al. | |
| 2006/0051011 A1 | 3/2006 | Ohmori et al. | |
| 2007/0076999 A1* | 4/2007 | Miyazaki et al. | 385/8 |
| 2008/0025662 A1 | 1/2008 | Kondo et al. | |

FOREIGN PATENT DOCUMENTS

| | | |
|---|---|---|
| EP | 1 315 021 A2 | 5/2003 |
| JP | 03-145623 | 6/1991 |
| JP | 04-024610 A1 | 1/1992 |
| JP | 05-034526 | 2/1993 |
| JP | 05-134220 | 5/1993 |
| JP | 6-289343 | 10/1994 |
| JP | 2001-215455 | 8/2001 |
| JP | 2003-215518 | 7/2003 |
| JP | 3742477 | 11/2005 |
| JP | 2007-052465 | 3/2007 |
| JP | 2007-172000 | 7/2007 |
| WO | 2006/090863 | 8/2006 |

* cited by examiner

*Primary Examiner*—Charlie Peng
*Assistant Examiner*—Eric Wong
(74) *Attorney, Agent, or Firm*—Burr & Brown

(57) ABSTRACT

An optical modulator has an optical waveguide substrate having a pair of principal surfaces, a pair of side surfaces an incident face and exit face of light, the substrate being composed of a ferroelectric material; a channel optical waveguide having at least a pair of branch sections, a multiplexing section of the branch sections and an exit section provided on the downstream of the multiplexing section, the waveguide being formed on the principal surface of the optical waveguide substrate; a modulation electrode electrodes for applying a signal voltage for modulating light propagating in the branch sections; and a reflective groove for reflecting leaked light of off-mode emitted from the multiplexing section and emitting the light from a principal surface of the optical waveguide substrate. An operating point of the optical modulator is controlled by changing a DC bias applied on the modulation electrode based on optical output of the leaked light of off-mode.

7 Claims, 13 Drawing Sheets

Relationship of cracks and light receiving sensitivity

OPTICAL MODULATORS

This application claims the benefits of Japanese Patent Applications P2007-285036 filed on Nov. 1, 2007 and P2008-276657 filed on Oct. 28, 2008, the entireties of which are incorporated by reference.

TECHNICAL FIELD OF THE INVENTION

The present invention relates to an optical modulator using a so-called Mach-Zehnder optical waveguide.

BACKGROUND OF THE INVENTION

A traveling-wave high-speed optical modulator using a Mach-Zehnder optical waveguide has drawn attention due to its wide wavelength band and low chirp characteristic. This type of optical modulators is adapted to propagate light in a pair of branch optical waveguides, respectively and merge output from each branch section together in multiplexing section. However, shift of operating point and so-called DC drift may be caused between the pair of branch sections due to a temperature difference or the like. A Mach-Zehnder (MZ) LN optical modulator generally involves the shift of operating point caused by temperature drift, DC drift, variation with time due to stress and the like, resulting in a deterioration of extinction ratio. This problem is important in operation of the modulator.

Several methods have been proposed to control such shift of operating point or DC drift. As a typical example, a method described in WO 2006-090863 A1 focuses attention on light of substrate radiation mode which is radiated from a multiplexing section of a pair of branch sections into a substrate. Namely in on-mode, light incident on the optical waveguide is propagated in the waveguides and radiated from the end faces of the waveguides. Light of off-mode is propagated to a light exit face of the substrate through the guiding optical waveguide and received at the light exit face using an optical fiber, and outgoing light from the optical fiber is detected by an optical detector. The DC bias of voltage applied from modulation electrodes to the optical waveguides is changed using an output signal from the optical detector, whereby the operating point of the optical modulator is adjusted.

The present inventor has developed an optical modulator of a thin plate structure, and has disclosed a method for efficiently controlling the operating point by drift in this structure, in Japanese Patent Laid-Open Publication No. 2003-215518A. A substrate thinned to 20 µm or less functions as a slab waveguide (the lateral width is generally treated as infinity in design of device structure) having a finite lateral width (the lateral width of the substrate). Lateral primary mode light generated in a Y-branch multiplexing section is made into slab mode and propagated in the thin-plate substrate with a low loss. Since this slab mode light is condensed into the thin-plate substrate (slab waveguide), different from a conventional modulator, sufficient radiation intensity can be obtained.

Further, means for taking out leaked light of off-mode in the Mach-Zehnder optical modulator is disclosed in Japanese Patent Laid-Open Publication No. 2007-52465A. According to this method, a 3 dB directional coupler is provided. However, generally a waveguide directional coupler has large wavelength dependence and therefore, it is difficult to obtain an extinction ratio between off-mode and on-mode.

Further, there is proposed a method in which as a non-waveguide optical modulator, a portion for reflecting light of off-mode leaked from the multiplexing section of the Mach-Zehnder optical waveguide is provided on an optical fiber array joined to a chip (Japanese Patent Laid-Open Publication No. 2001-215455A). In the case of using the above-described method, the problem of the extinction ratio is not generated; however, a special processing is required for the optical fiber array and therefore, the cost of constructional elements is increased.

Further, there is proposed a method in which the leaked light of off-mode is guided using a curved optical waveguide and a groove is formed at the outside of the curved optical waveguide as means for taking out guided light from a so-called directional coupler or multimode interference coupler (MMI) (Japanese Patent Laid-Open Publication No. 2007-172000A)

In addition, Japanese Patent Laid-Open Publication No. Hei 5-34526A discloses a method for forming an optical reflecting mirror mounted on optical surface. That is, a channel optical waveguide is formed on a substrate and a slit groove tilting toward the substrate surface is formed using machining and etching. When a wall surface of the groove is used as an end of the optical waveguide, light propagating in the optical waveguide is reflected by the wall surface of the groove and is emitted upward from the substrate surface. Electronic components mounted on the substrate surface receive this reflected light.

SUMMARY OF THE INVENTION

However, in a conventional method, when the leaked light of off-mode emitted from the multiplexing section of the Mach-Zehnder optical waveguide is received by a photo receiver, there is a problem that the leaked light of off-mode has low light intensity and the light-reception efficiency cannot be improved. Therefore, there is a possibility that a general photo detector has a problem with respect to stable control of operating point of the Mach-Zehnder optical waveguide.

As described in Japanese Patent Laid-Open Publication No. 2007-172000A, particularly a method of propagating the leaked light of off-mode in the curved optical waveguide to emit the light to the side surface is as follows. That is, when a curvature radius of the curved optical waveguide is reduced to make the curvature steep, light loss through the leaked light of off-mode increases and therefore, it becomes increasingly difficult to stably receive a desired light intensity. Therefore, the curvature of the curved optical waveguide must be smoothed to some extent; however, by doing so, the size of the optical waveguide substrate increases and a rated dimension cannot be satisfied. Accordingly as was expected, it is difficult to stably receive the leaked light of off-mode.

An object of the present invention is to improve the light-reception efficiency of the leaked light of off-mode to further stabilize the control of the operating point of the Mach-Zehnder optical waveguide when receiving, by the photo receiver, the leaked light of off-mode emitted from the multiplexing section of the Mach-Zehnder optical waveguide.

Further, an object of the present invention is to improve the light-reception efficiency to further stabilize the control of the Mach-Zehnder optical waveguide when receiving, by the photo receiver, the leaked light of off-mode or signal light emitted from the multiplexing section of the Mach-Zehnder optical waveguide.

An optical modulator according to a first invention comprises:

an optical waveguide substrate comprising a pair of principal surfaces, a pair of side surfaces, and an incident face and exit face of light, the substrate being composed of a ferroelectric material;

a channel optical waveguide comprising at least a pair of branch sections, a multiplexing section of the branch sections and an exit section provided on the downstream of the multiplexing section, the waveguide being formed on one of the principal surfaces;

a modulation electrode for applying a signal voltage for modulating light propagating in the branch sections; and a reflective groove for reflecting leaked light of off-mode emitted from the multiplexing section and emitting the light from the one principal surface, wherein:

an operating point of the optical modulator is controlled by changing a DC bias applied on the modulation electrode based on optical output of the leaked light of off-mode.

An optical modulator according to a second invention comprises:

an optical waveguide substrate comprising a pair of principal surfaces, a pair of side surfaces and an incident face and exit face of light, the substrate being composed of a ferroelectric material;

a channel optical waveguide comprising at least a pair of branch sections, a multiplexing section of the branch sections and an exit section provided on the downstream of the multiplexing section, the waveguide being formed on one of the principal surfaces;

a modulation electrode for applying a signal voltage for modulating light propagating in the branch sections;

a guiding optical waveguide that propagates signal light or leaked light of off-mode emitted from the multiplexing section; and a reflective groove that emits the signal light or the leaked light of off-mode to the outside of the optical waveguide substrate, the groove being formed so as to contact an exit end of the guiding optical waveguide.

An optical modulator according to a third invention comprises:

an optical waveguide substrate comprising a pair of principal surfaces, a pair of side surfaces, and an incident face and exit face of light, the substrate being composed of a ferroelectric material;

a channel optical waveguide comprising at least a pair of branch sections, a multiplexing section of the branch sections and an exit section provided on the downstream of the multiplexing section, the waveguide being formed on one of the principal surfaces;

a modulation electrode for applying a signal voltage for modulating light propagating in the branch sections;

a guiding optical waveguide that propagates signal light or leaked light of off-mode emitted from the multiplexing section;

a groove that is formed so as to contact an exit end of the guiding optical waveguide; and a light reflector that emits the signal light or the leaked light of off-mode to the outside of the optical waveguide substrate, the reflector being set in the groove.

According to the first invention, a reflective groove is formed on a substrate to fill the reflective groove with air or a material having a refractive index smaller than that of the substrate. Thereby leaked light of off-mode emitted into the substrate from a multiplexing section of the Mach-Zehnder optical waveguide can be reflected by the reflective groove, taken out from a upper surface of the substrate, and received using optical components mounted on the substrate surface. Further, according to the method, since the optical components are located near an optical waveguide, the light-reception efficiency of the leaked light of off-mode is high and the leaked light of off-mode is stably received, thereby applying the method to the control of operating point.

According to the second invention, a guiding optical waveguide guides the leaked light of off-mode or signal light emitted into the downstream from the multiplexing section of the Mach-Zehnder optical waveguide. Further, an end face of this guiding optical waveguide is connected to the reflective groove, and light propagating in the guiding optical waveguide is directly reflected by the reflective groove, thereby taking out the light to the side surface of the substrate. According to the above-described method, the guiding optical waveguide is not largely curved, and further, the leaked light of off-mode or the signal light can be taken out to the side surface with high efficiency.

According to the third invention, the guiding optical waveguide guides the leaked light of off-mode or signal light emitted into the downstream from the multiplexing section of the Mach-Zehnder optical waveguide. Further, light propagating in this guiding optical waveguide is directly reflected by a light reflector in the groove and taken out to a side surface of the substrate. According to the above-described method, the guiding optical waveguide is not largely curved, and further, the leaked light of off-mode or the signal light can be taken out to the side surface with high efficiency.

DETAILED DESCRIPTION OF THE INVENTION

Figure 1:
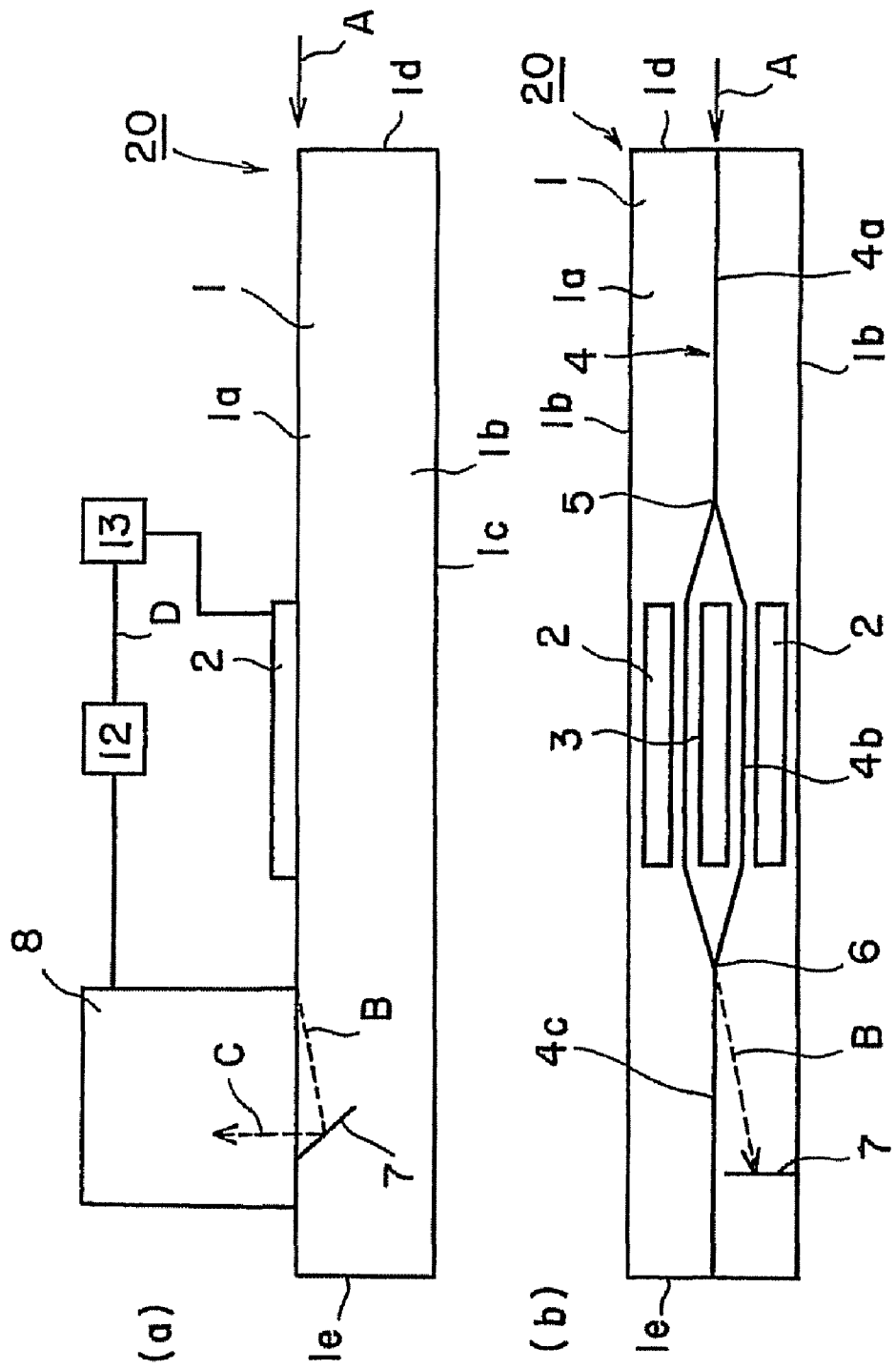
FIG. 1(a) is a schematic front view illustrating an optical modulator 20 according to a first invention and FIG. 1(b) is a schematic plan view illustrating the optical modulator 20.

The present invention will be described further in detail below in reference to the accompanying drawings.

FIG. 1(a) is a schematic front view illustrating an optical modulator 20 according to a first embodiment of a first invention and FIG. 1(b) is a schematic plan view illustrating the optical modulator 20.

An optical waveguide substrate 1 has a pair of principal surfaces 1a and 1c, a pair of side surfaces 1b, and an incident face 1d and exit face 1e of light. On the principal surface 1a of the optical waveguide substrate 1, a Mach-Zehnder three-dimensional optical waveguide 4 and modulation electrodes 2 and 3 are formed. An optical waveguide 4 has an incident section 4a, a pair of branch sections 4b, and an emission section 4c. A reference numeral 5 denotes a branch point and a reference numeral 6 denotes a multiplexing section. Since the control method of the light propagating in the optical waveguide 4 and the structure of the modulation electrodes are well known, descriptions thereof are omitted.

Light incident from an incident face 1d as indicated by an arrow A is branched at the branch point 5 and subjected to a modulation process while propagating in the pair of branch sections 4b to be multiplexed at the multiplexing section 6. Then, obtained signal light exits from an end face of the emission section 4c of the optical waveguide. An optical fiber array is attached to an emitting side end face 1e of the optical waveguide substrate 1, thereby transmitting the signal light through an optical fiber.

On the other hand, leaked light B of off-mode exits into the substrate from the vicinity of the multiplexing section 6. In this example, by forming a reflective groove 7 in the substrate 1, the leaked light B that is radiated into the substrate is reflected by the reflective groove 7 and emitted to the upper surface 1a as indicated by an arrow C.

Photo detectors 8 are mounted on the principal surface 1a of the substrate. The detectors 8 convert the received leaked light C into electric signals and transmit the signals to an automatic bias control circuit 12. The circuit 12 calculates an appropriate DC bias value from information on the leaked light C and transmits control signals to a bias-T circuit 13 as indicated by an arrow D to change the DC bias value, if necessary.

According to this example, the reflective groove 7 is formed in the substrate 1, the reflective groove 7 is filled with air or a material having a refractive index smaller than that of the substrate. By this configuration, the leaked light B of off-mode which exits into the substrate 7 from the multiplexing section 6 of the Mach-Zehnder optical waveguide is reflected by the reflective groove 7 and taken out from the upper surface of the substrate, thereby receiving the leaked light by the optical components 8 mounted on the substrate surface. According to the above-described method, a distance between the reflective groove and the light-sensitive elements is small, a light-reception efficiency of the leaked light of off-mode is high, and the leaked light of off-mode can be stably received. Therefore, the method can be applied to the control of the operating point.

Figure 2:
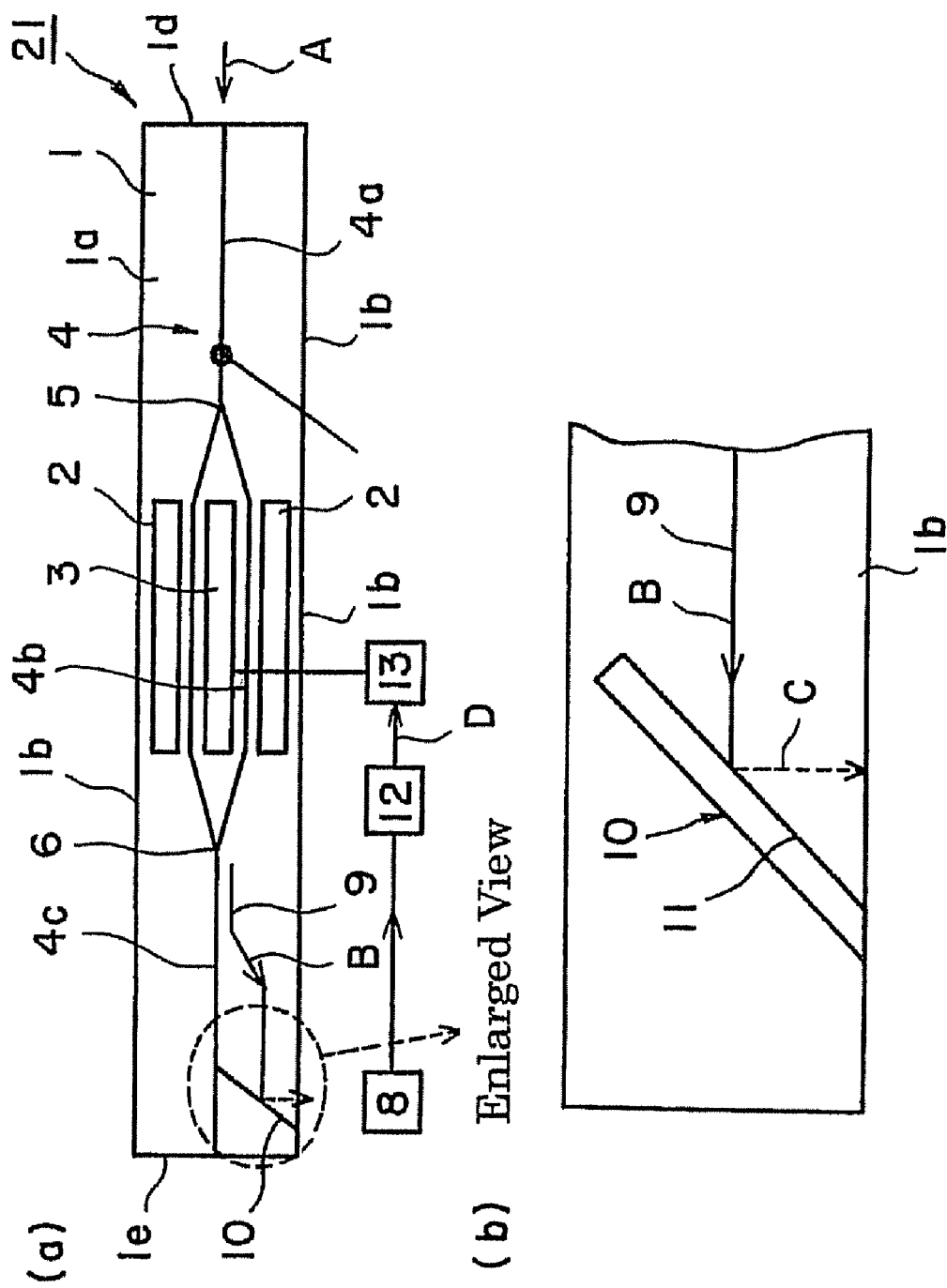
FIG. 2(a) is a schematic plan view illustrating an optical modulator 21 according to a second invention and FIG. 2(b) is a partial enlarged view illustrating the optical modulator 21.

FIG. 2(a) is a schematic plan view illustrating an optical modulator 21 according to a second invention and FIG. 2(b) is a partial enlarged view illustrating the optical modulator 21.

The optical waveguide substrate 1 has the pair of principal surfaces 1a and 1c, the pair of side surfaces 1b, and the incident face 1d and exit face 1e of light. On the principal surface 1a of the optical waveguide substrate 1, the Mach-Zehnder three-dimensional optical waveguide 4 and the modulation electrodes 2 and 3 are formed. The optical waveguide 4 has the incident section 4a, the pair of branch sections 4b, and the emission section 4c. A reference numeral 5 denotes the branch point and a reference numeral 6 denotes the multiplexing section.

Light incident from the incident face 1d as indicated by an arrow A is branched at the branch point 5 and subjected to a modulation process while propagating in the pair of branch sections 4b to be multiplexed at the multiplexing section 6. Then, obtained signal light exits from an end face of the emission section 4c of the optical waveguide. An optical fiber array is attached to the emitting side end face 1e of the optical waveguide substrate 1, thereby transmitting the signal light through an optical fiber.

In the vicinity of the multiplexing section 6, there is formed an end of a guiding optical waveguide 9 for guiding the leaked light of off-mode which exits from the multiplexing section 6. The optical modulator is designed such that the leaked light of off-mode can be shifted to the guiding optical waveguide between the guiding optical waveguide 9 and the multiplexing section 6. As a result, the leaked light of off-mode propagates to the guiding optical waveguide 9 from the multiplexing section 6 and further propagates in the waveguide 9 as indicated by an arrow B. The light is then reflected by a reflecting surface 11 of the reflective groove 10 formed in the substrate 1 and propagates to the side surface 1b as indicated by an arrow C and exits from the side surface 1b.

The photo detectors 8 are provided on the side surface 1b of the substrate. The detectors 8 convert the received leaked light C into electric signals and transmit the signals to the automatic bias control circuit 12. The circuit 12 calculates an appropriate DC bias value from information on the leaked light C and transmits control signals to the bias-Tee circuit 13 as indicated by an arrow D to change the DC bias value, if necessary.

According to this example, the guiding optical waveguide 9 guides the leaked light B of off-mode emitted from the multiplexing section 6 of the Mach-Zehnder optical waveguide 4. An end face of this guiding optical waveguide 9 is connected to the reflective groove 10 and the light B propagating in the guiding optical waveguide 9 is directly reflected by the reflective groove 10, thereby taking out the light B to the side surface 1b of the substrate. According to this method, the guiding optical waveguide 9 is not largely curved, and further, the leaked light B of off-mode can be taken out to the side surface 1b with high efficiency.

Figure 3:
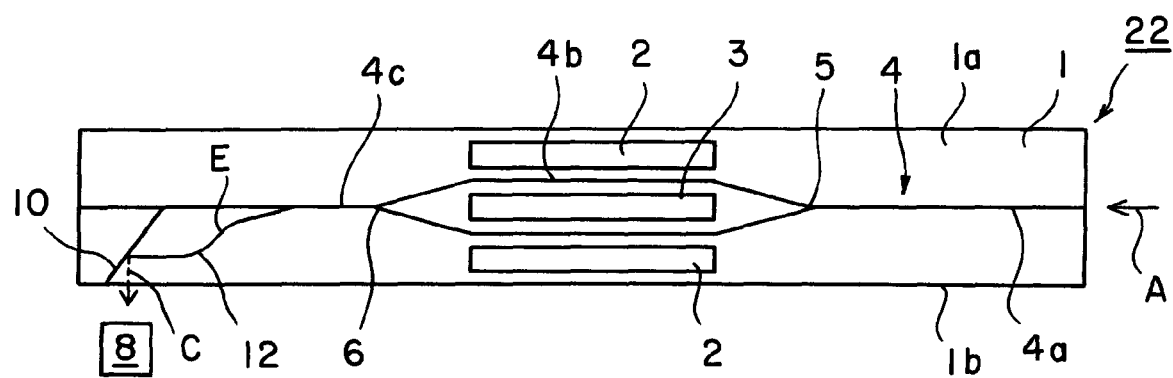
FIG. 3 is a schematic plan view illustrating an optical modulator 22 according to the second invention.

FIG. 3 is a schematic plan view illustrating an optical modulator 22 according to a second invention. In this example, since a guiding optical waveguide 12 is branched from the exit section 4c, signal light after the multiplexing propagates to the guiding optical waveguide 12 from the exit section 4c and further propagates in the guiding optical waveguide 12 as indicated by an arrow E. The signal light is reflected by the reflective groove 10 that is formed in the substrate 1, and propagates to the side surface 1b as indicated by an arrow C to exit from the side surface 1b. The light-sensitive detectors 8 are provided on the side surface 1b of the substrate and receive the signal light.

FIG. 4(a) is a schematic front view illustrating an optical modulator 30 according to the first and second inventions and FIG. 4(b) is a schematic plan view illustrating the optical modulator 30.

The optical modulator 30 of this example is basically the same as the optical modulator 20 in FIG. 1; however, the optical modulator 30 includes a guiding optical waveguide 29 extending to the reflective groove 7 from the multiplexing section 6. The leaked light of off-mode emitted from the multiplexing section 6 propagates in the guiding optical waveguide 29 as indicated by an arrow B and is reflected by the reflective groove 7. Then, the leaked light is incident on the photo detectors 8 mounted on the principal surface 1a of the substrate 1 and is received as indicated by an arrow C.

Figure 5:
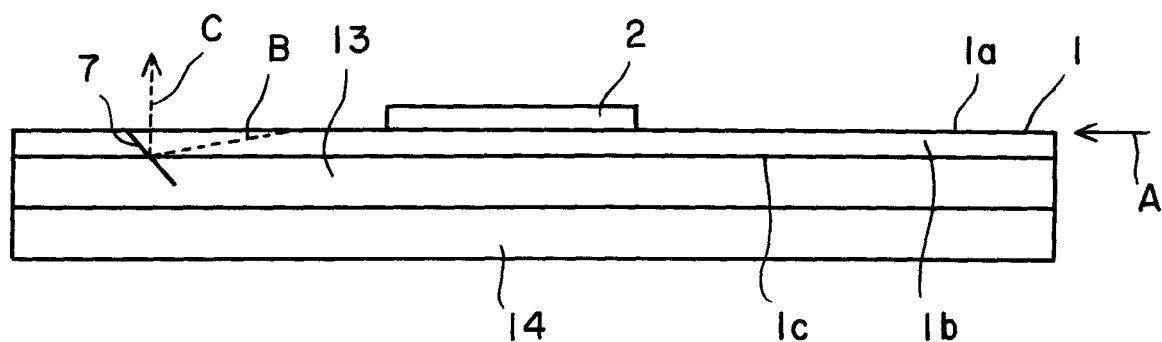
FIG. 5 is a schematic view illustrating a state where a substrate 1 in FIG. 1 is stuck on a support substrate 14 through an adhesive layer 13.

According to the first, second and third inventions, it is preferred that there is formed a support substrate and an adhesive layer that adheres the optical waveguide substrate to the support substrate therethrough on the other principal surface of the optical waveguide substrate. In an example shown in FIG. 5, for example, the other principal surface 1c of the optical waveguide substrate 1 is supported on a support substrate 14 through an adhesive layer 13.

In the above-described embodiment, the optical waveguide substrate 1 is thinned and allowed to function as a slab waveguide, and thereby particularly the leaked light of off-mode can be effectively propagated. A thickness of the substrate in this case is preferably equal to or more than 0.5 μm and further equal to or less than 30 μm depending on a wavelength of the leaked light and the dielectric constant of peripheral materials. If a thickness of this substrate is less than 0.5 μm, the optical waveguide is liable to be in a so-called cut-off condition. Further, if a thickness of the substrate is more than 30 μm, multiple-mode propagation is likely to occur dominantly and low-loss propagation is liable to be difficult.

Figure 6:
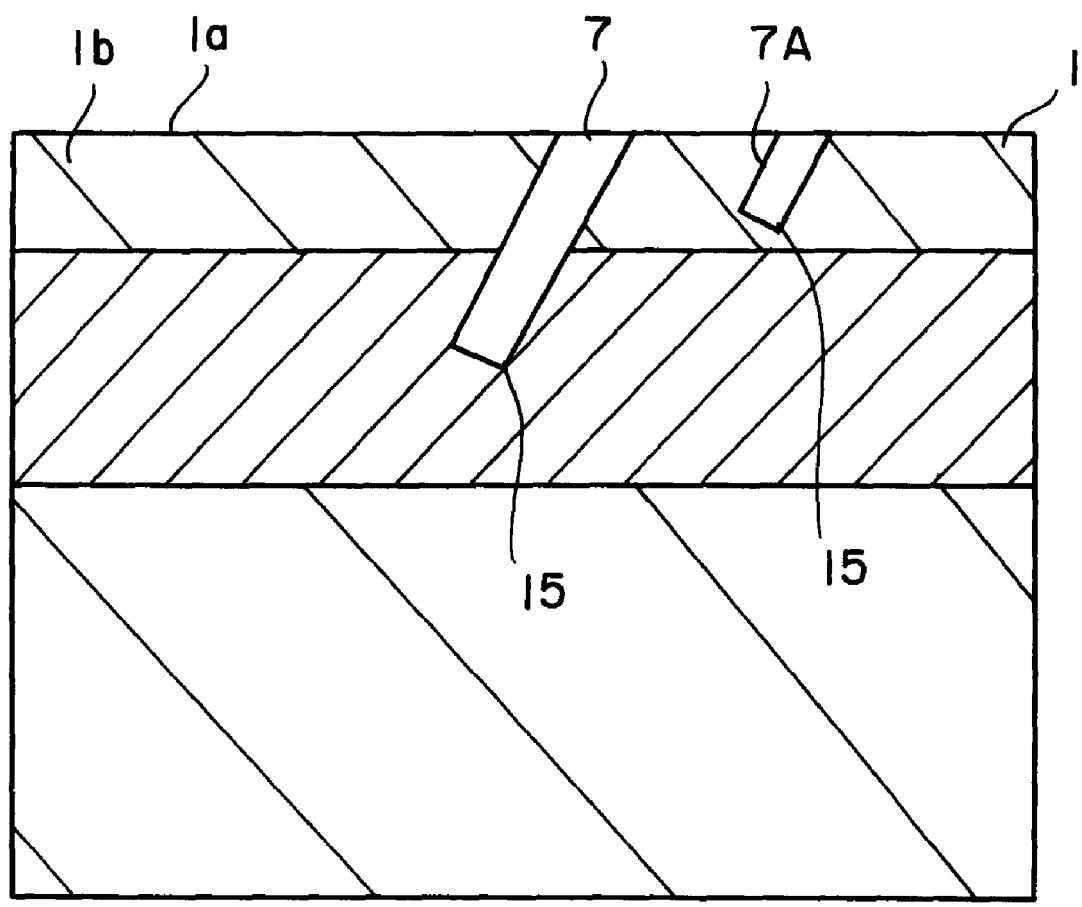
FIG. 6 is a view illustrating cross-sectional shapes of reflective grooves 7 and 7A.

In the first and second inventions, it is preferred that the reflective groove passes completely through to the other side of the optical waveguide substrate. Further, in the third invention, it is preferred that the groove for installing the light reflector passes completely through to the other side of the optical waveguide substrate. In an example of FIG. 6, for example, the reflective groove 7 passes through the substrate 1 and a reflective groove 7A fails to pass through the substrate 1. When the reflective groove 7A fails to pass through the substrate 1, stress concentration is easily caused by environmental fluctuations due to temperature variation in a bottom edge 15 of the groove 7A. As a result, there is a possibility that cracks are expanded in any direction from the stress concentration zone to spoil characteristics of the reflective groove. Therefore, the reflective groove previously passes completely through in the thickness direction of the substrate as in the reflective groove 7, thereby eliminating the possibility that cracks are caused in any direction from the bottom edge 15.

A method for forming a groove is not limited and the grinding as machining may be performed. When the grinding is collectively performed, for example, using chip pasting, the number of man-hours required for the formation of the groove can be reduced. Reflective grooves can be formed using etching techniques such as wet etching, dry etching, ion milling, and laser ablation.

The reflective groove or the groove for fixing a light reflector may be filled with air or evacuated. Alternatively a film including light-absorbing materials or light reflective materials can be formed on the wall surface of the reflective groove. A method for forming such film is not particularly limited, but chemical vapor deposition, sputtering, and vacuum deposition methods can be exemplified.

Further, the reflective groove can be filled with low dielectric constant materials. Organic resin materials such as polyimide, or inorganic glass can be exemplified as the low dielectric constant materials.

In the first, second and third inventions, although measurement of light intensity is preferred in the photo detector, phase or wavelength of light may be also measured. The kind of the photo detector is not particularly limited. When modulation of light is performed with an electric signal of 10 Gb/s, for example, an InGaAs-based optical detector with high response speed which has a sufficient bandwidth for detection or the like is used.

In the first, second and third inventions, the form of the multiplexing section is not particularly limited. Each branch section may intersect at the multiplexing section, or may be spatially separated. However, it is necessary that optical energy propagated through each branch section can merge at the multiplexing section.

Although at least one pair of the branch sections is needed, two or more pairs thereof may be present. A so-called cascade type optical waveguide can be adapted.

The channel optical waveguide and the guiding optical waveguide can be formed by proton exchange method, titanium internal diffusion method or metal ion diffusion method. Alternatively a ridge type three-dimensional optical waveguide can be formed by removing a surface of a substrate by means of machining or laser ablation.

In a preferred embodiment, the channel optical waveguide and the guiding optical waveguide are composed of ridge type optical waveguides protruded from the substrate. Such optical waveguides can be formed by the above-described method. Otherwise, the ridge type three-dimensional optical waveguide can be formed by forming, on a surface of a slab optical waveguide, a high-refractive index film by for example, chemical vapor deposition, physical vapor deposition, organic metal chemical vapor deposition, sputtering or liquid phase epitaxial method, and by performing machining or laser ablation of the high-refractive index film.

As the material forming the substrate of the optical modulator, the ferroelectric single crystal is preferably used, and there can be exemplified lithium niobate, lithium tantalate, lithium niobate-lithium tantalite solid solution, potassium lithium niobate, potassium lithium tantalate, potassium lithium niobate-potassium lithium tantalite solid solution and KTP.

As the material constituting the support substrate, ferroelectric single crystal as described above, glass and resin may be suitably used. As the adhesive between the support substrate and the optical waveguide substrate, glass or resin is preferred.

The above-described glass preferably has low dielectric constant and an adhesion temperature (working temperature) of about 600° C. or less. Further, glass capable of providing sufficient adhesive strength at the time of working is preferred. Concretely so-called solder glass obtained by combining two or more compositions of silicon oxide, lead oxide, aluminum oxide, magnesium oxide, calcium oxide, boron oxide and the like is preferably used. As the above-described resin, room temperature-curable, heat-curable and ultraviolet-curable resins are preferred and resins with low dielectric constant are preferred. Practically epoxy acryl and urethane resins are particularly preferred.

Figure 7:
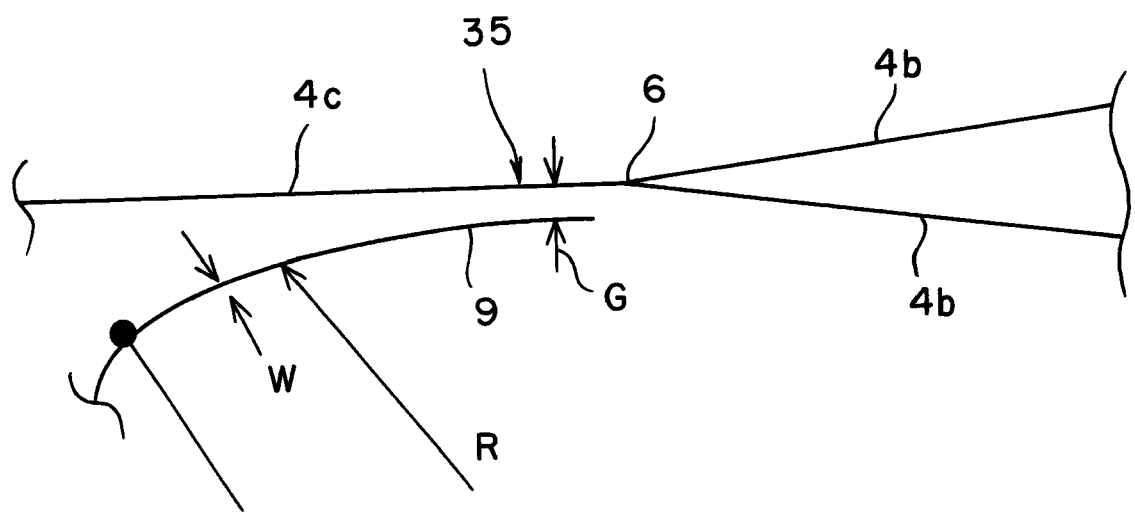
FIG. 7 is a plan view showing a positional relationship between a guiding optical waveguide 9 for leaked light of off-mode and an optical waveguide 4.

FIG. 7 is an enlarged schematic view illustrating the joint between the multiplexing section 6 and the guiding optical waveguide 9 that guides the leaked light of off-mode. A gap 35 is formed between the exit section 4c and the guiding optical waveguide 9.

When the guiding optical waveguide as shown in FIG. 7 is formed, the gap G from the multiplexing section 6, a width W of the guiding optical waveguide, and the curvature radius R of the guiding optical waveguide are used as a design parameter.

Figure 8:
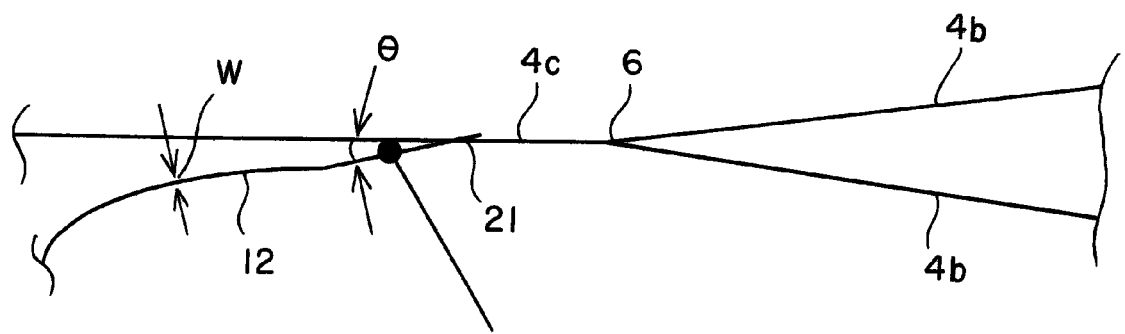
FIG. 8 is a plan view showing a positional relationship between a branch guiding optical waveguide 12 and the channel optical waveguide 4.

FIG. 8 shows an example of the guiding optical waveguide for branching signal light in the downstream of the multiplexing section. As shown in FIG. 8, an inclination angle θ of the guiding optical waveguide 12 from a central axis of the exit section 4c and a line width W of the guiding optical waveguide 12 are used as the design parameter of the branched guiding optical waveguide 12.

Figure 9:
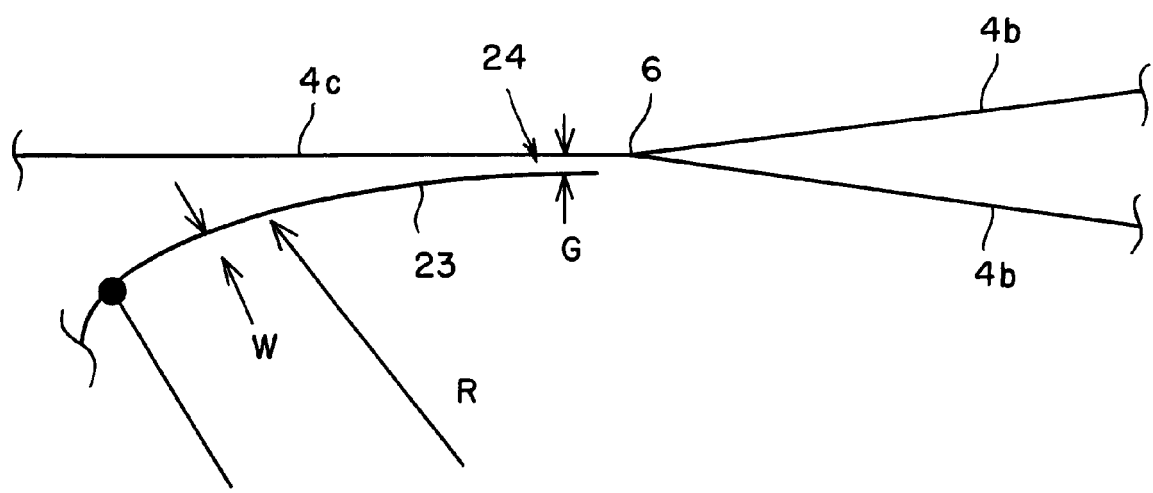
FIG. 9 is a plan view showing a positional relationship between a curved guiding optical waveguide 23 and the channel optical waveguide 4.

Further, as an example of the guiding optical waveguide branched from the exit section, a design of the curved waveguide used as the leaked light waveguide is more approximated to that of the leaked light waveguide and thereby the curved waveguide may be used as the branch waveguide propagating light permeated from a main waveguide. FIG. 9 illustrates a conceptual diagram on the above-described design. The curved waveguide is basically designed in the same manner as the waveguide using the curvature radius R of the leaked light waveguide; however, a size G of a gap 24 is small. In a normal directional coupler, a waveguide is disposed in parallel to the main waveguide, thereby obtaining predetermined characteristics. On the other hand, when the design is performed using this curved waveguide, desired characteristics are obtained by a R section. The curved waveguide is characterized by the fact that since the bending is started from the beginning of the coupling, the branch waveguide can be finally disposed at the position far from the main waveguide.

Figure 10:
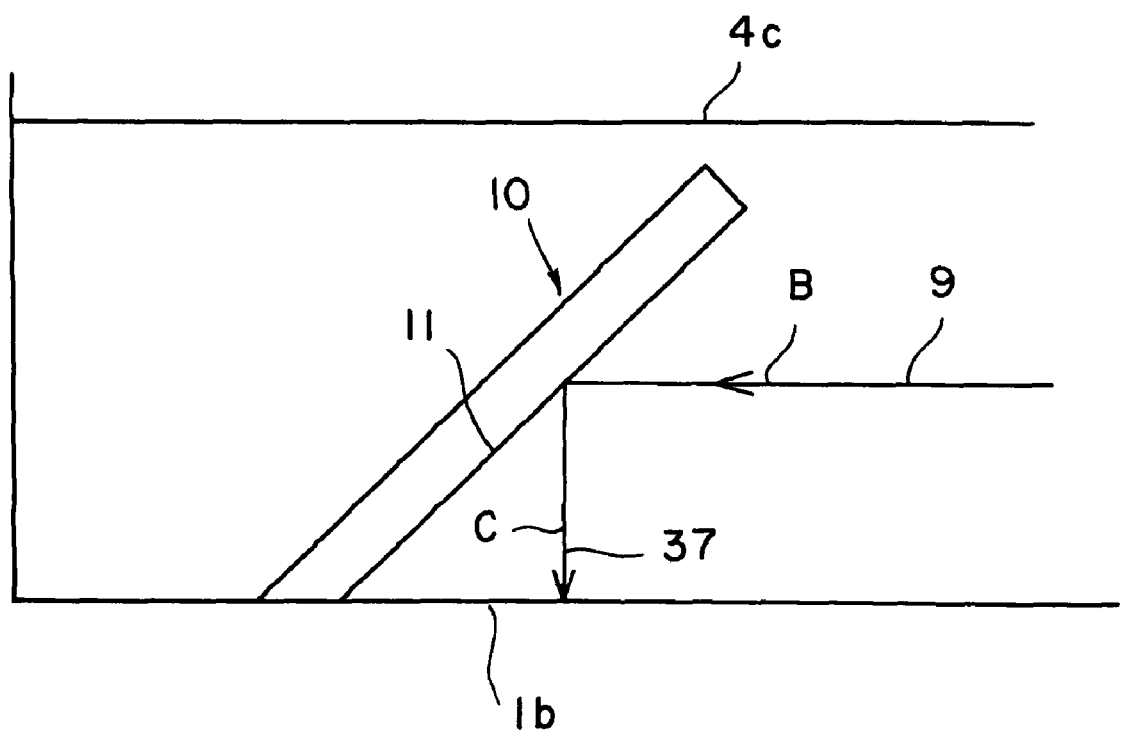
FIG. 10 is a plan view illustrating a state where a second guiding optical waveguide from a reflective groove 10 up to a side surface 1b is formed.

In addition, in an example shown in FIG. 10, the end of the guiding optical waveguide 9 is connected to the reflective groove 10 and light B propagating in the guiding optical waveguide 9 is reflected by the reflective groove 10. A second guiding optical waveguide 37 is formed and the light reflected by the reflective groove 10 is allowed to propagate through the guiding optical waveguide 37 to the side surface 1b, thereby taking out the light to the side surface 1b. As a result, the light taking-out efficiency can be further improved.

Figure 11:
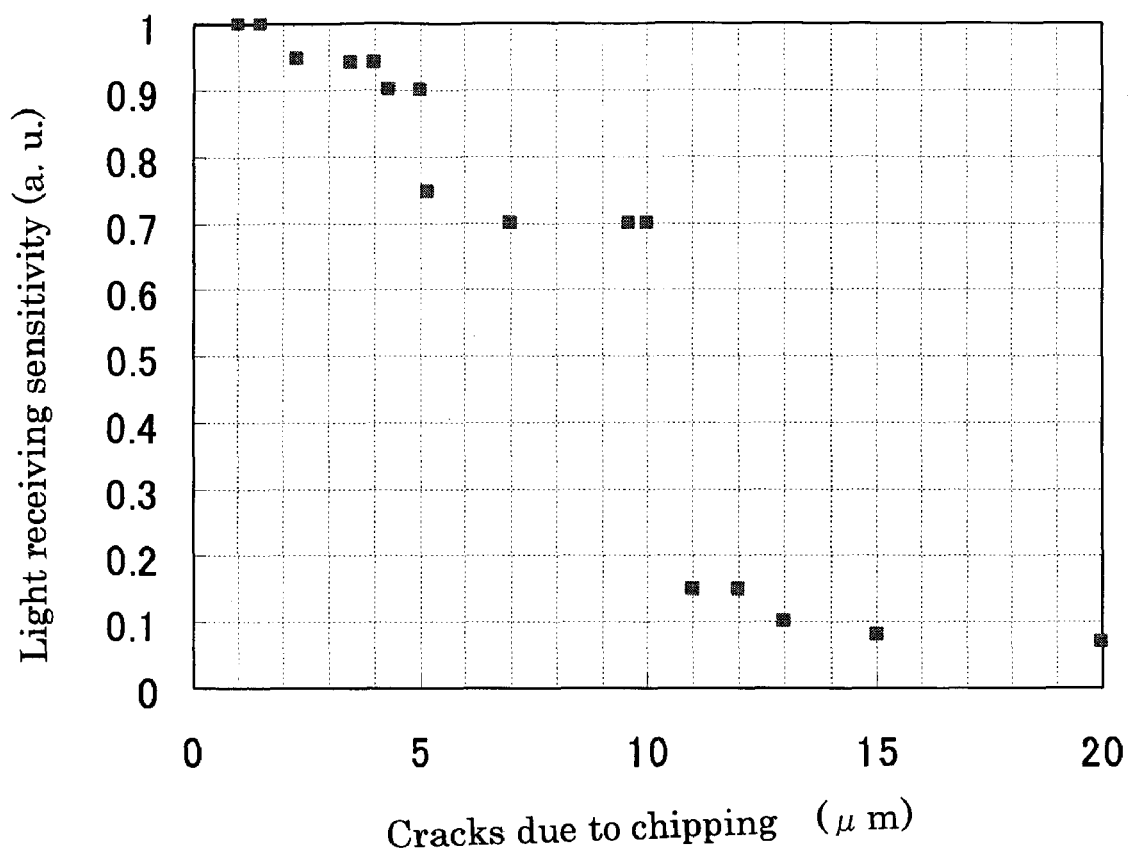
FIG. 11 is a graph showing a relationship between cracks of a groove and a light receiving sensitivity.

As understood in the first, second and third inventions, when cracks due to chipping occur on the substrate surface of a groove working part, light is scattered and the light-reception efficiency is reduced. FIG. 11 shows this relationship. From the viewpoint of the above-described relationship, cracks due to the chipping are preferably equal to or less than 10 μm, more preferably equal to or less than 6 μm, particularly preferably equal to or less than 5 μm. In the second and third inventions, cracks due to the chipping on the end of the guiding optical waveguide are particularly preferably maintained in this range.

In the third invention, the light reflector set not in the reflective groove but in the groove (slit) is used with regard to the reflection mechanism of light.

FIG. 12(a) is a front view illustrating an essential part of the optical modulator according to the third invention and FIG. 12(b) is an enlarged view illustrating the groove and the light reflector.

Figure 4:
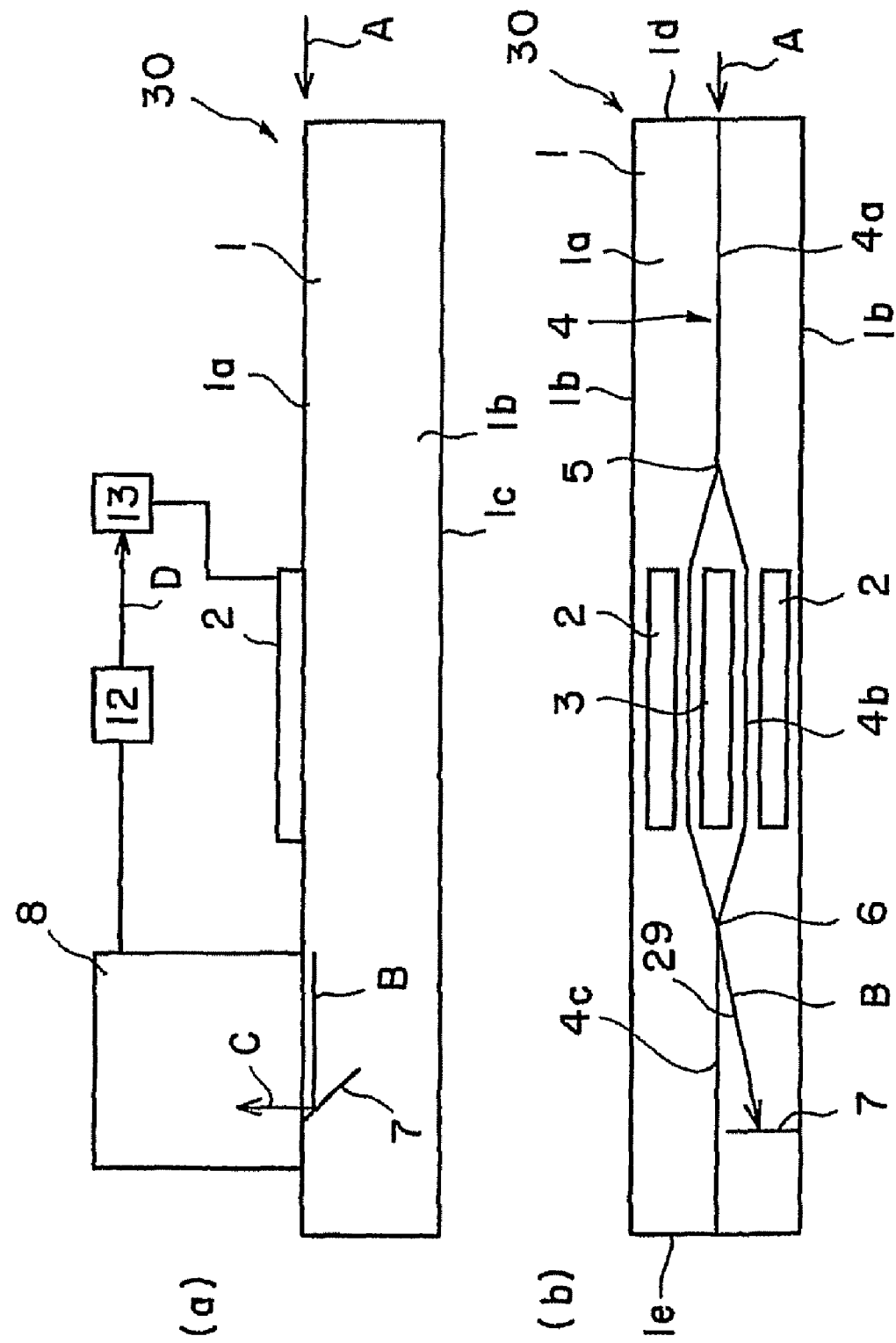
FIG. 4(a) is a schematic front view illustrating an optical modulator 30 according to the second invention and FIG. 4(b) is a schematic plan view illustrating the optical modulator 30.
Figure 12:
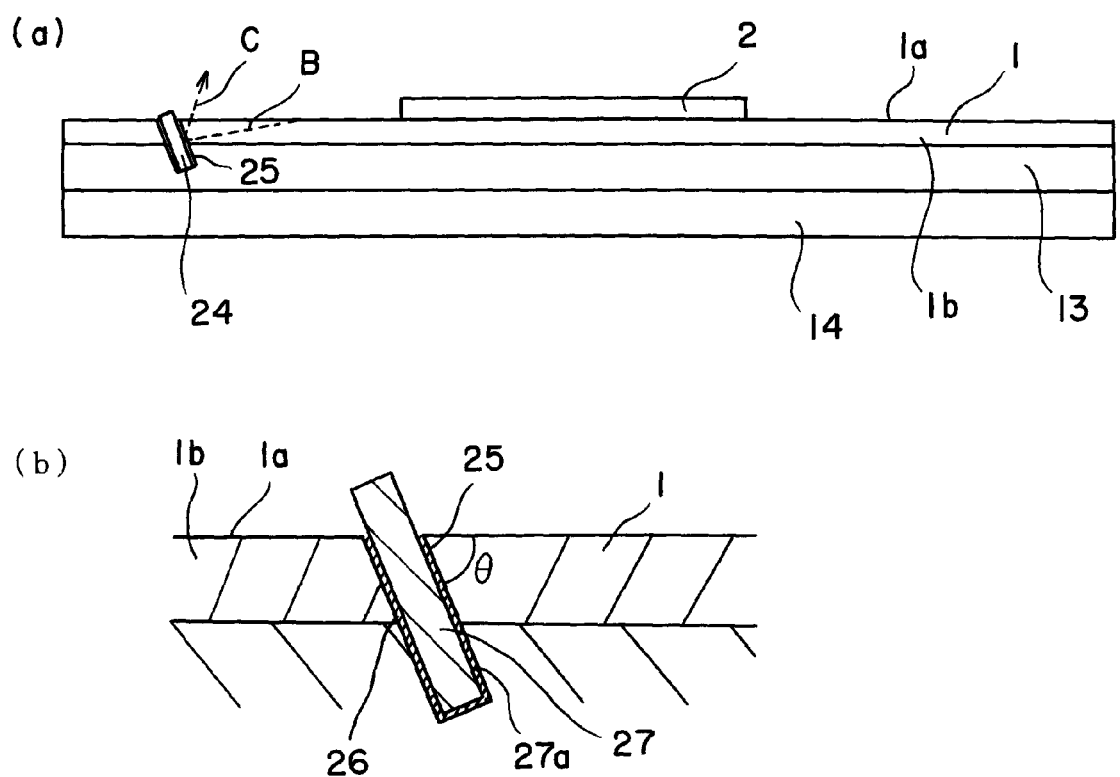
FIG. 12(a) is a schematic front view illustrating a structure of an optical modulator according to a third invention and FIG. 12(b) is a cross sectional view illustrating a groove and light reflector of the optical modulator in FIG. 12(a).

The example of FIG. 12 illustrates the case where the photo detectors 8 mounted on the principal surface 1a of the substrate 1 shown in FIG. 4 receive light reflected from the light reflector. The groove 25 is formed so as to pass completely through the substrate 1 and further to pass partially through the adhesive layer 13. A width of the groove 25 is constant, and a wall surface of the groove 25 forms the inclination angle θ with respect to the upper surface 1a. A light reflector 27 is set in the groove 25 and fixed into the groove with an adhesive 26. The light B propagating in the guiding optical waveguide is reflected by a reflecting surface 27a, and propagates upward as indicated by an arrow C to enter into the photo detectors.

The angle θ of the slit (inclination angle formed by the groove with respect to the principal surface 1a of the optical waveguide substrate 1) is not particularly limited and the light B can be reflected to any direction depending on positions and shapes of the light reflector.

However, it should be noted that in order that cracks due to the chipping may be reduced in machining the groove as described above, the inclination angle θ of the groove is preferably increased as much as possible. From the viewpoint of the fact, the inclination angle θ is preferably set to be equal to or more than 40°, and more preferably set to be equal to or more than 45°.

On the other hand, when the inclination angle θ is extremely increased, the angle of reflected light emitted from the optical waveguide substrate is turned to the vicinity of the horizontal surface, and therefore, it becomes difficult to mount the photo detectors 8 on the substrate 1. In terms of the fact, the upper limit of the inclination angle is preferably set to be equal to or less than 86°.

Figure 13:
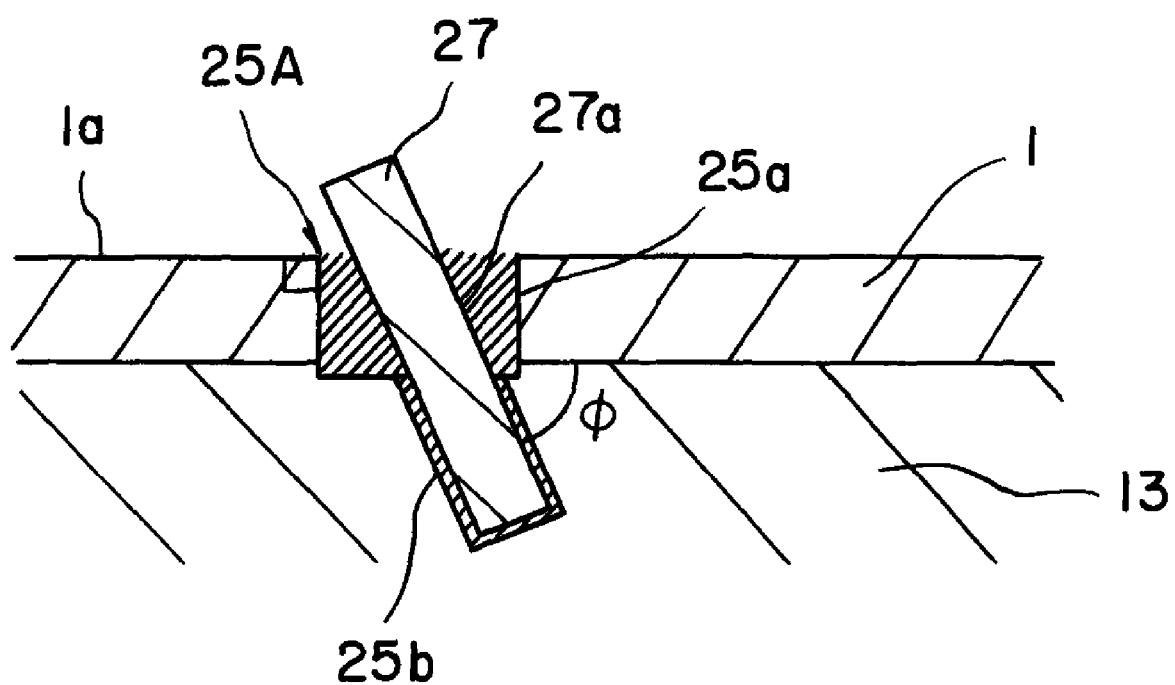
FIG. 13 is a cross sectional view illustrating shapes of a groove and light reflector according to another embodiment.

Further, an example of FIG. 13 illustrates the case where a groove positioned perpendicular to the principal surface is formed in the optical waveguide substrate. In this structure, a groove 25A is formed to fix the light reflector 27 thereto. The groove 25A includes a groove 25a that passes through the optical waveguide substrate 1 and a groove 25b formed in the adhesive layer 13. The groove 25a is oriented perpendicular to the upper surface 1a. The groove 25b formed in the adhesive layer 13 is tilted by an angle φ with respect to the upper surface 1a. The light reflector 27 is inserted into the grooves 25a and 25b, and fixed to the grooves.

Light emitted from the guiding optical waveguide is reflected by the reflecting surface 27a of the light reflector 27 and received by the photo detectors 8 mounted on the principal surface 1a of the substrate 1. Further, a waveguide substrate section is vertically subjected to a slit processing (groove 25a) as shown in FIG. 13 and can supply light to the photo detectors with high efficiency without the influence of the chipping due to the slit processing.

It is preferred that the light reflector can totally reflect light emitted from the guiding optical waveguide. From the viewpoint that the thermal expansion coefficient of the light reflector is adjusted to that of the optical waveguide substrate, the above-described materials on the optical waveguide substrate may be used for those of the light reflector. In particular, the ferroelectric single crystal is preferably used, and there can be exemplified lithium niobate, lithium tantalate, lithium niobate-lithium tantalite solid solution, potassium lithium niobate, potassium lithium tantalate, potassium lithium niobate-potassium lithium tantalite solid solution and KTP.

Further, a material with high reflectance may be coated at least on the reflecting surface of the light reflector. As such a coating material, a metal film such as gold, silver or a dielectric multilayer film may be exemplified.

The adhesive for fixing the light reflector in the groove is not particularly limited as long as the adhesive has a refractive index lower than that of the optical waveguide substrate. The above-described glass and resin can be exemplified as the adhesive.

EXAMPLES

Experiment A

Hereinafter, the optical modulator shown in FIG. 4 was manufactured and tested.

Concretely the optical waveguide substrate 1 is formed from a lithium niobate single crystal. A substrate consisting of a 3-inch wafer is used.

A titanium diffusion waveguide 4 is first formed on a 3-inch lithium niobate substrate with a thickness of 1 mm. A line width of titanium is set to 3.6 μm and a so-called Mach-Zehnder optical waveguide that is branched into a Y-branch waveguide in midstream is produced. Further, a gap with a distance of about 10 μm is spaced apart from the multiplexing section 6 of the Mach-Zehnder optical waveguide, and the guiding optical waveguide 29 that guides leaked light is formed. This titanium waveguide pattern is thermally diffused at 1031° C. to produce an optical waveguide. Then, electrodes 2 and 3 are formed using a plating processing. A gap between the electrodes is set to 15 μm, and a thickness of the electrodes is set to 15 μm.

Next, a lithium niobate single crystal substrate is thinned by grinding. Wax is first applied to the principal surface 1a of the lithium niobate substrate 1 and the substrate 1 is stuck on a dummy lithium niobate substrate (with a thickness of 1 mm). In this state, a rear surface 1c of the patterned lithium niobate substrate 1 is ground by polishing and thinned to a thickness of 7 μm by grinding. Further, the support lithium niobate substrate 14 (see FIG. 5) is stuck on the rear surface of the patterned lithium niobate substrate 1 after this grinding through a sheet resin with a thickness of about 50 μm, and the original dummy substrate is finally removed. The chip cutting and end face polishing are finally carried out to obtain chips.

The slit-shaped reflective groove 7 is formed in the vicinity of the terminal end of the leaked light guiding waveguide 29 formed on this chip. The groove 7 is formed by grinding using a grindstone with a width of 50 μm. In the direction of the groove 7, an inclination is imparted to the principal surface 1a of the substrate 1 and the groove 7 forms an inclination angle 45°. By this configuration, the leaked light of off-mode propagating in the leaked light guiding waveguide 29 is taken out to the upper surface of chips, and received using a Photo Detector to be outputted as a current. As a result, the light-reception efficiency of the leaked light of off-mode relative to the light input to the Mach-Zehnder optical waveguide is 10 mA/W, and a practicable level is obtained.

Experiment B

Hereinafter, the optical modulators shown in FIGS. 12 and 4 were manufactured and tested.

Concretely the optical waveguide substrate 1 is formed from a lithium niobate single crystal. A substrate consisting of a 3-inch wafer is used.

A titanium diffusion waveguide 4 is first formed on a 3-inch diameter lithium niobate wafer with a thickness of 1 mm. A line width of titanium is set to 3.6 μm and a so-called Mach-Zehnder optical waveguide that is branched into a Y-branch waveguide in midstream is produced. Further, a gap with a distance of about 10 μm is spaced apart from the multiplexing section 6 of the Mach-Zehnder optical waveguide, and the guiding optical waveguide 29 that guides leaked light is formed. This titanium waveguide pattern is thermally diffused at 1031° C. to produce an optical waveguide. Then, electrodes 2 and 3 are formed using a plating processing. A gap between the electrodes is set to 15 μm, and a thickness of the electrodes is set to 15 μm.

Then, a lithium niobate single crystal substrate is thinned by grinding. Wax is first applied to the principal surface 1a of the lithium niobate substrate 1 and the substrate 1 is stuck on a dummy lithium niobate substrate (with a thickness of 1 mm). In this state, a rear surface 1c of the patterned lithium niobate substrate 1 is ground by polishing and thinned to a thickness of 7 μm by grinding. Further, the support lithium niobate substrate 14 (see FIG. 5) is stuck on the rear surface of the patterned lithium niobate substrate 1 after this grinding through a sheet resin with a thickness of about 50 μm and the original dummy substrate is finally removed. The chip cutting and end face polishing are finally carried out to obtain chips.

The slit-shaped groove 25 is formed in the vicinity of the terminal end of the leaked light guiding waveguide 29 formed on the chips. The groove 25 is formed by grinding using a grindstone with a width of 50 μm. The groove 25 forms an inclination angle θ=45°. The light reflector 27 is set in the groove 25 using resin adhesive. The reflector 27 is made by vapor deposition of Ti/Pt/Au on quartz, processed to a width of 45 μm and then inserted into the slit. By this configuration, the leaked light of off-mode propagating in the leaked light guiding waveguide 29 is taken out to the upper surface of chips, and received using a Photo Detector to be outputted as a current. As a result, the light-reception efficiency of the leaked light of off-mode relative to the light input to the Mach-Zehnder optical waveguide is 10 mA/W, and a practicable level is obtained.

The invention claimed is:

1. An optical modulator comprising:
an optical waveguide substrate comprising a first principal surface and a second principal surface, a pair of side surfaces, and an incident face and exit face of light, the substrate comprising a ferroelectric material;
a channel optical waveguide comprising at least a pair of branch sections, a multiplexing section of the branch sections and an exit section provided on the downstream of the multiplexing section, the waveguide being formed on the first principal surface;
a modulation electrode for applying a signal voltage for modulating light propagating in the branch sections, the modulation electrode being formed on the first principal surface of the optical waveguide substrate;
a support substrate;
an adhesive layer adhering the second principal surface of the optical waveguide substrate to the support substrate;
a photodetector mounted on the first principal surface of the optical waveguide substrate; and
a reflective groove for reflecting leaked light of off-mode emitted from the multiplexing section and emitting the light from the first principal surface, the reflective groove penetrating through the optical waveguide substrate between the first principal surface and the second principal surface and extending into the adhesive layer, wherein:
an operating point of the optical modulator is controlled by changing a DC bias applied on the modulation electrode based on optical output of the leaked light of off-mode.

2. The optical modulator of claim 1, wherein the optical waveguide substrate has a thickness of 0.5 μm to 30 μm.

3. An optical modulator, comprising:
an optical waveguide substrate comprising a first principal surface and a second principal surface, a pair of side surfaces, and an incident face and exit face of light, the substrate comprising a ferroelectric material;
a channel optical waveguide comprising at least a pair of branch sections, a multiplexing section of the branch sections and an exit section provided on the downstream of the multiplexing section, the waveguide being formed on the first principal surface;
a modulation electrode for applying a signal voltage for modulating light propagating in the branch sections, the modulation electrode being formed on the first principal surface of the optical waveguide substrate;
a guiding optical waveguide propagating signal light or leaked light of off-mode emitted from the multiplexing section;
a support substrate;
an adhesive layer adhering the second principal surface of the optical waveguide substrate to the support substrate;

a photodetector mounted on the first principal surface of the optical waveguide substrate; and a reflective groove emitting the signal light or the leaked light of off-mode outside of the optical waveguide substrate from the first principal surface, the groove being formed so as to contact an exit end of the guiding optical waveguide and penetrate through the optical waveguide substrate between the first principal surface and the second principal surface and extend into the adhesive layer, wherein an operating point of the optical modulator is controlled by changing a DC bias applied on the modulation electrode based on optical output of the leaked light of off-mode.

4. The optical modulator of claim 3, wherein the optical waveguide substrate has a thickness of 0.5 μm to 30 μm.

5. An optical modulator, comprising:

an optical waveguide substrate comprising a first principal surface and a second principal surface, a pair of side surfaces, and an incident face and exit face of light, the substrate comprising a ferroelectric material;

a channel optical waveguide comprising at least a pair of branch sections, a multiplexing section of the branch sections and an exit section provided on the downstream of the multiplexing section, the waveguide being formed on the first principal surface;

a modulation electrode for applying a signal voltage for modulating light propagating in the branch sections, the modulation electrode being formed on the first principal surface of the optical waveguide substrate;

a guiding optical waveguide propagating signal light or leaked light of off-mode emitted from the multiplexing section;

a support substrate;

an adhesive layer adhering the second principal surface of the optical waveguide substrate to the support substrate;

a photodetector mounted on the first principal surface of the optical waveguide substrate;

a groove formed so as to contact an exit end of the guiding optical waveguide, the groove penetrating through the optical waveguide substrate between the first principal surface and the second principal surface and extending into the adhesive layer; and a light reflector emitting the signal light or the leaked light of off-mode outside of the optical waveguide substrate from the first principal surface, the reflector being set in the groove, wherein an operating point of the optical modulator is controlled by changing a DC bias applied on the modulation electrode based on optical output of the leaked light of off-mode.

6. The optical modulator of claim 5, wherein:

the groove is formed perpendicular to the principal surface in the optical waveguide substrate.

7. The optical modulator of claim 5, wherein the optical waveguide substrate has a thickness of 0.5 μm to 30 μm.

* * * * *